United States Patent [19]

Fujita et al.

[11] Patent Number: 4,956,215

[45] Date of Patent: Sep. 11, 1990

[54] OPTICAL RECORDING CARD AND METHOD OF PRODUCING THE SAME

[75] Inventors: Minoru Fujita; Yoichi Fukushima, both of Tokyo, Japan

[73] Assignee: Kyodo Printing Co., Ltd., Tokyo, Japan

[21] Appl. No.: 302,039

[22] Filed: Jan. 23, 1989

Related U.S. Application Data

[63] Continuation of Ser. No. 68,543, Jun. 29, 1987, abandoned.

[30] Foreign Application Priority Data

Jul. 1, 1986 [JP] Japan .................................. 61-154872
Jul. 1, 1986 [JP] Japan .................................. 61-154873

[51] Int. Cl.⁵ .................................. B32B 3/02
[52] U.S. Cl. .................................. 428/64; 428/65; 428/201; 428/203; 428/204; 428/206; 428/913; 430/11; 430/12; 430/14; 430/15; 430/16; 430/945; 369/288; 156/60; 156/228; 346/76 L; 346/135.1
[58] Field of Search .................. 428/64, 65, 201, 203, 428/204, 206, 913; 430/11, 12, 14, 15, 16, 945; 369/288; 156/60, 228; 346/76 L; 8/135.1

[56] References Cited

U.S. PATENT DOCUMENTS

| | | | |
|---|---|---|---|
| 4,507,346 | 3/1985 | Maurer et al. | 428/211 |
| 4,579,754 | 4/1986 | Maurer et al. | 430/14 |
| 4,673,626 | 6/1987 | Takeda et al. | 430/12 |
| 4,692,394 | 9/1987 | Drexler | 430/12 |

*Primary Examiner*—Patrick Ryan
*Attorney, Agent, or Firm*—Martin A. Farber

[57] ABSTRACT

This optical recording card includes optical recording medium which is formed with optical information patterns each of which has an optical reflective layer and information stored in the optical recording card can be read out in dependency on the difference in optical reflectivity of the optical information pattern. It is not economical that the optical reflective layer of the optical recording card is formed on a base sheet by etching or the like, wherein the base sheet is prepared in the form of a sheet. The optical recording card is produced by way of the steps of forming an optical reflective layer on a continuous base film having large area and then die cutting the assembly of optical reflective layer and base film into a large number of optical recording cards having required dimensions in such a state that the optical recording medium is held between a card base and a protective sheet.

20 Claims, 3 Drawing Sheets

OPTICAL RECORDING CARD AND METHOD OF PRODUCING THE SAME

RELATED APPLICATION:

This application is a continuation of our co-pending application Ser. No. 07/068,543 filed June 29, 1987.

BACKGROUND OF THE INVENTION

1. FIELD OF THE INVENTION

The present invention relates to an optical recording card and a method of producing the same.

In the recent years a number of cards in which various kinds of information are recorded are increasingly put in practical use as ID card, cash card or bank card.

2. DESCRIPTION OF THE PRIOR ART

This kind of card is required to record various kinds of informations such as data concerning individual person, data concerning a company from which the card is issued or the like data. In the earlier age such information was recorded using visual characters and symbols and in the later age they were recorded in response to electrical signals which were generated magnetically. However, due to rapid increase in number of cards the conventional card is not now in position to take adequate measures for preventing data from being falsified and moreover for the current tendency of increased volume of information.

In view of the current situation as mentioned above a card including an optical recording layer to which the latest optical technology is applied to record information has been developed in the recent years. This kind of card is called optical recording card.

To facilitate understanding of the present invention a conventional optical recording card which has been hitherto proposed will be described below as its basic structure with reference to FIG. 2. As is apparent from the drawing, the optical recording card 1 includes a card base 2, a protective layer 3 made of transparent plastic material and an optical recording layer 4 which is interposed between the card base 2 and the protective layer 3. Reading-out of information stored in the optical recording layer 4 is effected from the side of the protective layer 3. The optical recording layer 4 is provided with a light reflective layer which has an optical reflective surface. The optical reflective surface is formed with a number of data pits and reading-out of data is achieved by detecting presence and absence in dependency on the difference in optical reflectivity of each of the data pits while laser beaming is emitted toward the optical recording layer 4.

A conventional method which is hitherto employed for producing the optical recording mediums or optical recording cards including the same is typically practiced by way of the steps of forming a metallic reflective film over the whole surface of the base sheet in the form of a sheet having the same size as the card base by using a vacuum depositing process, placing optical information patterns on a part of the metallic reflective film serving as recording medium, removing the residual part of the same which is not used as recording medium and then adhesively securing to the card base the base sheet which includes the thus prepared optical recording medium.

In spite of the fact that the optical recording medium is usually provided on a part of the optical recording card, the method of producing the latter is practiced by way of the steps of preparing a base sheet in the form of a sheet having the same size as the card base, forming a metallic reflective film over the whole surface of the base sheet and removing an unnecessary part of the metallic reflective film which does not form optical information patterns, as mentioned above. This leads to a result of not only increased number of productions steps and elongated time required for production but also increased loss in material whereby the optical recording cards are produced at an expensive cost. Further since the optical recording medium is handled in the form of a sheet having the same size of the card base, it is difficult to improve productive efficiency.

SUMMARY OF THE INVENTION

Hence, the present invention has been made with the foregoing background in mind and its object resides in providing an optical recording card and a method of producing the same both of which assure that mass production of optical recording cards can be achieved without substantial loss in material and moreover the number of steps and time required for production of the optical recording cards can be reduced remarkably.

To accomplish the above object there is proposed according to an aspect of the present invention an optical recording card including optical recording medium which is held between a card base and a light permeable protective layer, wherein the improvement consists in that the optical recording medium comprises a base film, an optical reflective film formed on the base film and an optical information pattern layer having low optical reflectivity formed on the optical reflective film in direct surface contact or adhesively secured thereto by an adhesive layer.

Further, there is proposed according to other aspect of the present invention a method of producing optical recording cards each of which includes optical recording medium comprising an optical reflective film and an optical information pattern layer having low optical reflectivity with which the surface of the optical reflective film is covered, the optical recording medium being located between a card base and a light permeable protective layer, wherein the method comprises the steps of forming the optical reflective film on a web of base film, forming the optical information pattern layer on the optical reflective film to constitute an optical recording medium assembly, adhesively securing the optical recording medium assembly onto a web of protective layer with the aid of an adhesive, adhesively securing a web of card base onto the web of protective layer in such a state that the optical recording medium assembly is held therebetween whereby an optical recording card assembly is constituted, and die cutting the optical recording card assembly into a number of optical recording cards.

Further, there is proposed according to another aspect of the present invention a method of producing optical recording cards each of which includes optical recording medium comprising an optical reflective film and an optical information pattern layer having low optical reflectivity with which the surface of the optical reflective film is covered, the optical recording medium being located between a card base and a light permeable protective layer, wherein the method comprises the steps of forming the optical information pattern layer on a web of protective layer, forming the optical reflective film on a web of base film, adhesively securing the web of protective layer onto the web of base film in such a state that the optical information pattern layer and the optical reflective film are superimposed one above another, adhesively securing the web of protective layer onto a web of card base in such a state that the optical reflective film and the base film are held therebetween whereby an optical recording card assembly is constituted, and die cutting the optical recording card assembly into a number of optical recording cards.

Other objects, features and advantages of the present invention will become readily apparent from reading of the following description which has been prepared in conjunction with the accompanying drawings.

BRIEF DESCRIPTION OF THE DRAWINGS

The present invention will be illustrated in the following drawings in which.

DESCRIPTION OF THE PREFERRED EMBODIMENTS

Now, the present invention will be described in a greater detail hereunder with reference to the accompanying drawings which illustrate preferred embodiments thereof.

Figure 1:
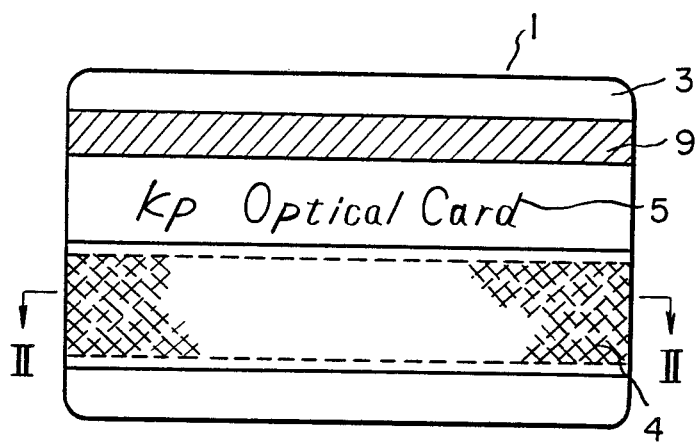
FIG. 1 is a front view of an optical recording card in accordance with an embodiment of the present invention.
Figure 2:
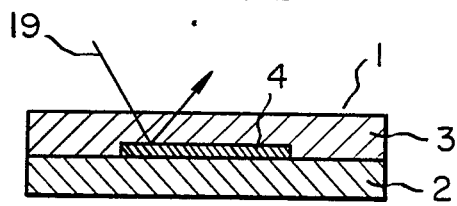
FIG. 2 is a vertical sectional view of a typical conventional optical recording card.
Figure 3:
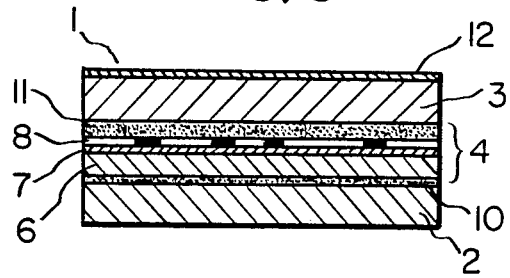
FIG. 3 is a fragmental enlarged sectional view of the optical recording card of the invention taken in line II—II in FIG. 1.

In FIGS. 1 and 3 reference numeral 1 designates an optical recording card. The optical recording card 1 is so constructed that an optical recording medium 4 is interposed between a card base 2 and a protective layer 3 and the card base 2, the layer of the optical recording medium 4 and the protective layer 3 are adhesively secured to one another to constitute a layered structure.

The card base 2 serves to assure a strength of the optical recording card 1 and paper, or a plate made of synthetic resin such as material is employed for the card base 2. Further, a visual pattern layer 5 S placed on the card base 2 by printing or the like operation in order to display visual information such as a letter, figure or the like. and a magnetic recording layer 9 is placed on the rear surface of card base 2 or on the protective layer 3.

The protective layer 3 is constituted by material having excellent light permeability such as polycarbonate resin, acrylic resin, epoxy resin or the like. The optical recording medium 4 includes a base film 6, an optical reflective layer 7 placed on the base film 6 and an optical information pattern layer 8 placed on the optical reflective film 7. The base film 6 functions as a support member for supporting the optical reflective film 7 and the optical information pattern layer 8 thereon. Particularly, the base film 6 is constructed by a film having excellent flatness made of polyester, polycarbonate, polyethyleneterephthalate, polyimide, polyamide, polysulfon, polyethersulfon, polyetherketon, polyetheretherketon, polyetherimide or the like material and has a thickness in the range of 5 microns to 1 mm, preferably in the range of 10 to 200 microns. The optical reflective film 7 is a film which is vacuum deposited on the base film 6. Specifically, the optical reflective film 7 is constructed by a thin film made of material having high optical reflectivity and as material constituting the reflective film 7 metallic material such as Ni, Ti, Te, Bi, In, Pb, Sn, Sb, Zn, Se, Cd, Ga, Ag, Au, Cu, Cr, Al or the like or their alloy material having a thickness in the range of 50 to 2000 Å or compound material based on organic material and inorganic material such as Te—C, Te—CS2, Bi—CS$_2$, Te—teflon, Ag—gelatine or the like having a thickness in the range of 100 Å to 10 microns or multilayered film such as Te—dyestuff, Te—nitrocellulose, metallic material film dielectric material film or the like having a thickness in the range of 100 Å to 10 microns or dyestuff film such as cyanine dye, phthalocyanine dye, naphtoquinone dye or the like having a thickness in the range of 100 Å to 10 microns or compound material comprising organic material such as nitrocellulose , styrene, acetic acid vinyl, gelatine or the like and dyestuff or sub-oxide such as TeOx, GeOx, SbOx, MoOx or the like or layered material comprising metallic material and organic material such as AuPt—(PS, PMMA, PVAc or the like), Al teflon or magnetic film material such as MnCuBi, CdCo, TbCo, TbFe, GdTbFe, TbFeCo or the like having a thickness in the range of 100 to 2000 Å is used therefor. As mentioned above, the optical reflective film 7 is formed by vaccum depositing the above-noted material on the base film 6.

Incidentally, in order to assure improved flatness of the base film 6 and increased adhesiveness of the optical reflective film 7 a subbing layer may be interposed between the base film 6 and the optical reflective film 7. The optical information pattern layer 8 is formed on the optical reflective film 7. The optical information pattern layer 8 is a layer having low optical reflectivity which is formed with a number of fine pores and stripes representative of data pits or guide tracks. Accordingly, the optical reflective film 7 is exposed to the outside at the position where the fine pores and stripes are formed so as to constitute data pits or guide tracks.

The optical information pattern layer 8 is generally formed by way of the steps of coating the optical reflective layer 7 with printing or photographic emulsion and then carrying out exposing and developing or forming a colored layer having low optical reflectivity on the optical reflective layer 7 and allowing it to be subjected to etching or lift-off or forming a pattern by etching or lift-off and then coloring the layer on which the pattern is formed.

The thus prepared optical recording medium 4 is adhesively secured to the protective layer 3 with the aid of a transparent adhesive layer 11. Thus, the optical recording medium 4 is interposed between the card base 2 and the protective layer 3 by adhesively securing the former to the latter by using an adhesive layer 10. Incidentally, the above-mentioned adhesive layer is constructed by transparent resin such as copolymer of polyvinyl chloride—acetic acid vinyl, polyurethane resin, polyester resin, epoxy resin or the like.

It should be noted that in order to improve resistivity against damage or injury the reading side of the protective layer 3 may be integrally or separately provided with a surface hardening layer 12 having high hardness which is formed in the form of a film having a thickness in the range of 1 to 20 microns by coating UV hardened type acrylic resin, silicon resin or the like.

Figure 4:
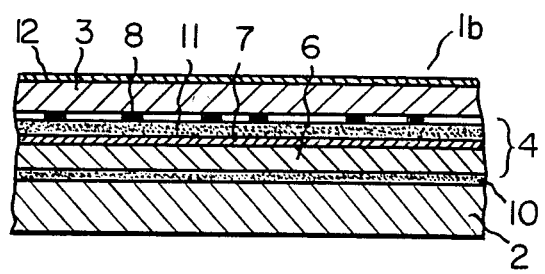
FIG. 4 is a fragmental enlarged sectional view of an optical recording card in accordance with another embodiment of the present invention.

FIG. 4 illustrates by way of a vertical sectional view other type of optical recording card 1b. The optical recording card 1b as shown in FIG. 4 is different from the optical recording card 1 as shown in FIG. 3 in respect of the fact that the adhesive layer 11 is interposed between the optical information pattern layer 8 and the optical reflective film 7. Namely, in the case of the optical recording card 1b the optical reflective film 7 is formed on the base film 6, the optical information pattern layer 8 is formed inside the protective layer 3 and the optical reflective film 7 is later adhesively secured to the optical information pattern layer 8 with the use of an adhesive 11 while the latter is superimposed on the former.

Figure 5:
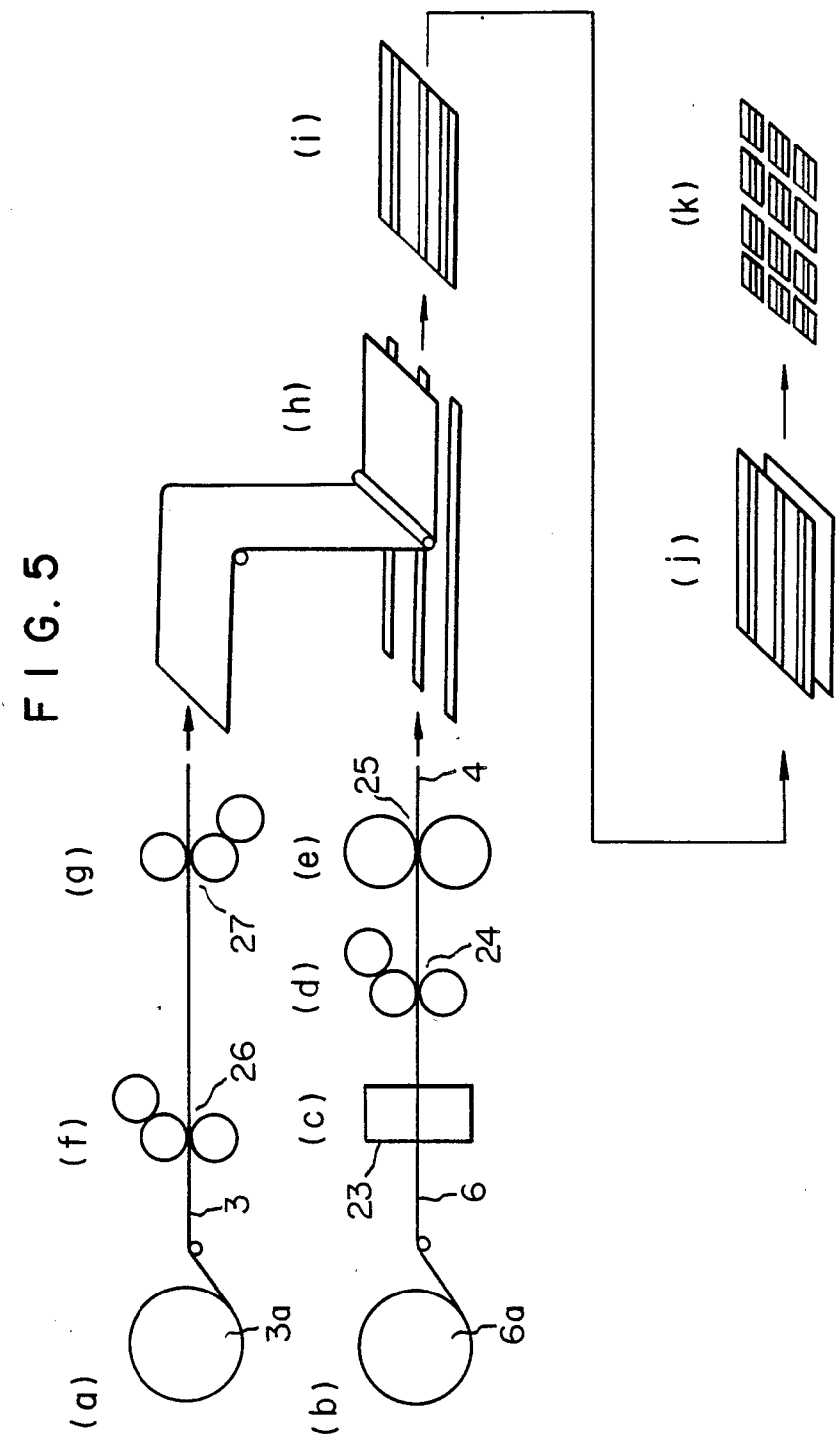
FIG. 5 is a schematic perspective view illustrating a method of producing optical recording cards in accordance with another embodiment of the present invention.

Next, an example of a process for producing optical recording cards as shown in FIG. 3 will be described below with reference to FIG. 5 . FIG. 5 illustrates typically individual producing steps of producing optical recording cards in a flow chart.

First, a web 3a in the form of a roll for a protective layer 3 and a web 6a in the form of a roll for a base film are prepared (see FIG. 5(a)(b)).

By a vaccum depositing apparatus 23, an optical reflective film 7 is formed on the one surface of the base film 6 (see FIG. 5(a)). Next, an optical information pattern layer 8 is printed on the thus prepared optical reflective layer 7 with the use of an ink having low optical reflectivity by operating a printing machine 24 (see FIG. 5(d)). Thus, an optical recording medium 4 is produced Next, it is slit into a plurality of tapes by means of a slitter 25 (see FIG. 5(e)).

A film for the protective layer 3 is unwound from the web 3a and the outside surface thereof is subjected to surface hardening by operating a coater 26 (see FIG. 5(f)). Further, the inside surface of the film is coated with an adhesive 11 by operating a coater 27 (see FIG. 5(g)).

Thereafter, the protective layer 3 and the optical recording medium 4 which have been prepared in that way are adhesively secured to one another using an adhesive layer 11 (see FIG. 5(h)). Next, the web comprising the protective layer 3, the optical recording medium 4 and the adhesive layer 11 is successively cut to a number of sheets (see FIG. 5(i)). Next, the protective layer 3 in the form of a sheet and the card base 2 in the form of a sheet on which an adhesive 10 is previously coated are adhesively secured to one another in such a state that the optical recording medium 4 is interposed therebetween (see FIG. 5(j)).

Thus, a number of optical recording cards 1 are produced by die cutting an assembly of optical recording cards which has been prepared in an integral structure in the form of a sheet in the above-described manner (see FIG. 5(k)).

The thus produced optical recording card 1 is practically used in such a manner that the side of the protective layer 3 serves as a reading side, a light beam is introduced into the optical recording medium 4 from the reading side and presence and absence of a data pit are read out by detecting difference in reflectivity so that information stored therein can be read out.

Figure 6:
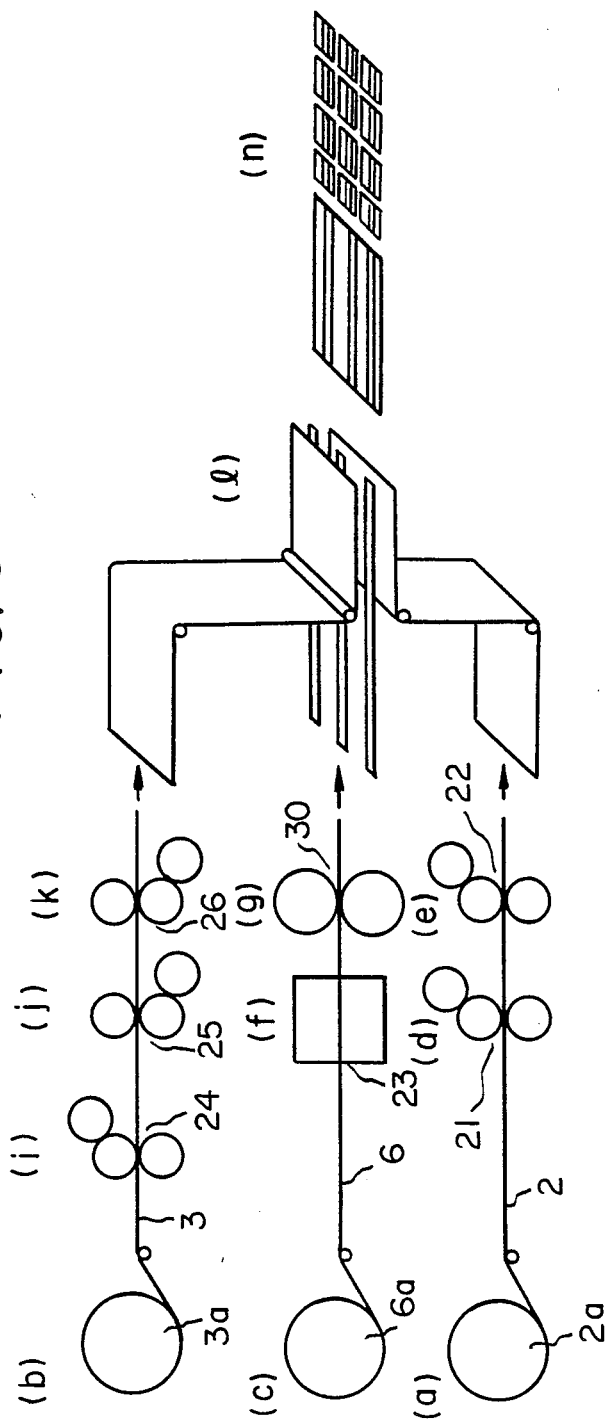
FIG. 6 is a schematic perspective view illustrating a method of producing optical recording cards in accordance with still another embodiment of the present invention.

Next, a process for producing optical recording card 1b as shown in FIG. 4 will be described below with reference to FIG. 6. FIG. 6 illustrates typically individual producing steps of producing optical recording cards in a flow chart.

First, a web 2a in the form of a roll for a card base 2, a web 3a in the form of a roll for a protective layer 3 and a web 6a in the form of a roll for base films are prepared (see FIGS. 6(a), (b) and (c)). The card base 2 is unwound from the web 2a and a plurality of predetermined card figures are printed by operating a printing machine 21 (see FIG. 6(d)). Further, the inside surface of the card base 2 is coated with an adhesive 11 by operating a coater 22 (see FIG. 6(e)).

On the other hand, by a vacuum depositing apparatus 23, an optical reflective film 7 is formed on the one surface of the base film 6 (see FIG. 6(f)).

Next, it is slit into a plurality of tapes by means of a slitter 30 (see FIG. 6(g)). Further, a film for the protective layer 3 is unwound from the web 3a and the outside surface thereof is subjected to surface hardening treatment by operating a coater 24 (see FIG. 6(i)). Further, an optical information pattern layer 8 is printed on the inside surface of the film by operating a printing machine 25 (see FIG. 6(j)). Moreover, the inside surface of the same is coated with an adhesive 11 by means of a coater 26 (see FIG. 5(k)).

After the card base 2, the protective layer 3, the base film 6 and the optical reflective film 7 have been prepared in the above-described manner, the optical information pattern layer 8 and the base film 7 are adhesively secured to one another with the use of an adhesive layer 11 in such a state that the optical information pattern layer 8 and the optical reflective film 7 are superimposed one above another. Further, the protective layer 3 and the film of the card base 2 are adhesively secured to one another with the use of an adhesive layer 10 in such a state that the optical reflective film 7 and the base film 6 are held therebetween (see FIG. 6(l)).

Thus, a number of optical recording cards 1b are produced by die cutting an assembly of optical recording cards which has been prepared in an integral structure in the form of a sheet in the above-described manner (see FIG. 6(n)).

The thus produced optical recording card 1b is practically used in such a manner that the side of the protective layer 3 serves as reading side, light beam is introduced into the optical recording medium 4 from the a reading side, a and presence and absence of a data pit are read out by detecting difference in reflectivity so that information stored therein can be read out.

Advantageous Effects

The present invention offers the following advantageous effects. The optical recording card of the invention is produced by way of the steps of forming an optical reflective layer on a continuous base film having a large area and then die cutting the thus formed assembly comprising base film and optical reflective layer to required dimensions. In consequence, production of the optical recording card is achieved without an occurrence of useless loss in material and moreover the number of steps required for production and production time can be remarkably reduced compared with a production process in which a number of sheet materials are used.

Further, when the optical production card of the invention is produced, formation of the optical reflective layer constituting the optical recording medium is achieved by employing web material adapted to be wound about a reel. In the case where the optical reflective layer is formed in accordance with the conventional process in which a number of sheet materials are used, vacuum deposition on an area of A1 size costs more than ten times as much as in the case of the web winding process. Accordingly, the present invention exhibits a remarkable advantageous effect from the viewpoint of production of the optical reflective layer.

The optical recording card of the invention is so constructed that the optical reflective layer and the optical information pattern layer are formed separate from one another in function. This leads to a result that it has stability in maintenance of the recorded state and employment of material for each of the layers is not restricted specifically due to the fact that they are separated from one another. Thus, the recording medium layer can be formed by a combination of inexpensive materials.

What is claimed is:

1. In an optical recording card including optical recording medium which is held between a card base and a light permeable protective layer, the improvement wherein said optical recording medium comprises a base film, an optical reflective film formed only on said base film and an optical information pattern layer having low optical reflectivity formed on said optical reflective film in direct surface contact, a locating of said reflective film between said base film and said pattern layer permitting use of a reading light beam incident upon said reflective film via said pattern layer; and wherein said card base is made of paper, a plate of synthetic resin selected from the group consisting of PVC, PET, polycarbonate or a plate of metallic material;

said protective layer is constructed of plastic material having high light permeability selected from the group consisting of polycarbonate, acrylic resin, and epoxy resin;

said base film is selected from the group consisting of polycarbonate, polyethyleneterephthalate, polyimide, polyamide, polysulfone, polyethersulfone, polyetherketone, polyetheretherketone or polyetherimide and has a thickness in the range of 5 microns to 1mm;

said optical reflective film is constructed of a metallic material selected from the group consisting of Ni, Ti, Te, Bi, In, Pb, Sn, Sb, Zn, Se, Ga, Cd, Ag, Au, Cu, Cr, Al, or the like or their alloy material having a thickness in the range of 50 to 2000 Å or compound material comprising organic material and/or inorganic material selected from the group consisting of Te—C, Te—CS$_2$, Bi—CS$_2$, Te—telfon, Ag—gelatine or the like having a thickness in the range of 100 Å to 10 microns or multilayered film selected from the group consisting of Te—dyestuff, Te—nitrocellulose, metallic material film-dielectric material film having a thickness in the range of 100 Å to 10 microns or dyestuff film selected from the group consisting of cyanine dye, phthalocyanine dye, naphtoquinone dye having a thickness in the range of 100 Å to 10 microns or compound material comprising organic material selected from the group consisting of nitrocellulose, styrene, polyvinyl acetate (PVAc), gelatine and dyestuff or sub-oxide selected from the group consisting of TeOx, GeOx, SbOx, MoOx or layered material comprising metallic material and organic material selected from the group consisting of AuPt—(polystyrene, polymethylmethacrylate, polyvinylacetate), Al—teflon or the like or magnetic film material selected from the group consisting of MnCuBi, CdCo, TbCo, TbFe, GdTbFe, TbFeCo. having a thickness in the range of 100 Å to 5000 Å; and said optical information pattern layer is constructed of printing ink or coating material having lower light reflectivity than said optical reflective film, there being pits in said optical information pattern formed by etching or lift off.

2. A method of producing optical recording cards each including an optical recording medium which is held between a card base and a light permeable protective layer, the improvement in the optical recording medium comprising a base film, an optical reflective film formed only on said base film and an optical information pattern layer having low optical reflectivity placed on said optical reflective film in direct surface contact, a locating of said reflective film between said base film and said pattern layer permitting use of a reading light beam incident upon said reflective film via said pattern layer, wherein said base film is constructed by polycarbonate, polyethyleneterephthalate, polyimide, polyamide, polysulfone, polyethersulfone, polyetherketone, polyetheretherketone or polyetherimide and has a thickness in the range of 5 microns to 100 microns, said method comprising the steps of forming the optical reflective film on a web of base film, constructing the optical information pattern layer as a layer of material having lower light reflectivity than said optical reflective film, said constructing including steps of providing pits in said optical information pattern layer, and locating said information pattern layer on the optical reflective film to constitute an optical recording medium assembly.

adhesively securing said optical recording medium assembly onto a web of protective layer with the aid of an adhesive, adhesively securing said web of base onto said web of protective layer in such a state that the optical recording medium assembly is held therebetween whereby an optical recording card assembly is constituted, and die cutting said optical recording card assembly into a number of optical recording cards.

3. A method as claimed in claim 2, wherein said card base is made of paper, a plate of synthetic resin from the group consisting of PVC, PET, polycarbonate or the like or a plate of metallic material.

4. A method as claimed in claim 2, wherein said protective layer is constructed by plastic material having high light permeability from the group consisting of polycarbonate, acrylic resin, epoxy resin or the like.

5. A method as claimed in claim 9, wherein said base film is constructed by polycarbonate, polyethyleneterephthalate, polyimide, polyamide, polysulfone, polyethersulfone, polyetherketone, polyetheretherketone or polyetherimide and has a thickness in the range of 5 microns to 1 mm.

6. A method as claimed in claim 2, wherein
said optical reflective film is constructed by metallic material from the group consisting of Ni, Ti, Te, Bi, In, Pb, Sn, Sb, Zn, Se, Ga, Cd, Ag, Au, Cu, Cr, Al, or the like or their alloy material having a thickness in the range of 50 to 2000 Å or compound material comprising organic material and/or inorganic material from the group consisting of Te—C, Te—$CS_2$, Bi—$CS_2$Te-telfon, Ag—gelatine or the like having a thickness in the range of 100 Å-0 to 10 microns or multilayered film from the group consisting of Te-dyestuff, Te-nitrocellulose, metallic material film-dielectric material film or the like having a thickness in the range of 100 Å to 10 microns or dyestuff film from the group consisting of cyanine dye, phthalocyanine dye, naphtoquinone dye or the like having a thickness in the range of 100 Å- to 10 microns or compound material comprising organic material from the group consisting of nitrocellulose, styrene, acetic acid vinyl, gelatine or the like and dyestuff or sub-oxide from the group consisting of TeOx, GeOx, SbOx, MoOx or the like or layered material comprising metallic material and organic material from the group consisting of AuPt-(polystyrene, polymethylmethacrylate, polyvinylacetate or the like), Al-teflon or the like or magnetic film material from the group consisting of MnCuBi, CdCo. TbCo, TbFe, GdTbFe, TbFeCo or the like having a thickness in the range of 100 Å to 5000 Å.

7. A method as claimed in claim 2, wherein said optical information pattern layer having low light reflectivity is formed by way of the steps of coating the optical reflective film with printing.

8. A method of producing optical recording cards including an optical recording medium which is held between a card base and a light permeable protective layer, the improvement in said optical recording medium comprising a base film, an optical reflective film only formed on said base film and an optical information pattern layer having low optical reflectivity is adhesively secured to the optical reflective film with the aid of an adhesive layer, a locating of said reflective film between said base film and said pattern layer permitting use of a reading light beam incident upon said reflective film via said pattern layer,
wherein said base film is constructed by polycarbonate, polyethyleneterephthalate, polyimide, polyamide, polysulfon, polyethersulfon, polyetherketon, polyetheretherketon or polyetherimide and has a thickness in the range of 5 microns to 100 microns, preferably in the range of 10 to 50 microns,
said method comprising the steps of;
forming the optical information pattern layer on a web of protective layer,
adhesively securing said web of protective layer onto said web of base film in such a state that the optical information pattern layer and the optical reflective film are superimposed on base another,
adhesively securing said web of protective layer onto a web of card base in such a state that the optical reflective film and the base film are held therebetween whereby an optical recording card assembly is constituted, and
die cutting said optical recording card assembly into a number of optical recording cards.

9. A method as claimed in claim 8, wherein said card base is made of paper, a plate of synthetic resin from the group consisting of PVC, PET, polycarbonate or the like or a plate of metallic material.

10. A method as claimed in claim 8, wherein said protective layer is constructed by plastic material having high light permeability from the group consisting of polycarbonate, acrylic resin, epoxy resin or the like.

11. A method as claimed in claim 8, wherein said base film is constructed by polycarbonate, polyethyleneterephthalate, polyimide, polyamide, polysulfone, polyethersulfone, polyetherketone, polyetheretherketone or polyetherimide and has a thickness in the range of 5 microns to 1 mm.

12. A method as claimed in claim 8, wherein said optical reflective film is constructed by metallic material from the group consisting of Ni, Ti, Te, Bi, In, Pb, Sn, Sb, Zn, Se, Ga, Cd, Ag, Au, Cu, Cr, Al, or the like or their alloy material having a thickness in the range of 50 to 2000 Å or compound material comprising organic material and/or inorganic material from the group consisting of Te—C, Te—$CS_2$, Bi—$CS_2$, Te—telfon, Ag—gelatine or the like having a thickness in the range of 100 Å to 10 microns or multilayered film from the group consisting of Te-dyestuff, Te-nitrocellulose, metallic material film-dielectric material film or the like having a thickness in the range of 100 Å to 10 microns to dyestuff film from the group consisting of cyanine dye, phthalocyanine dye, naphtoquinone dye or the like having a thickness in the range of 100 Å to 10 microns or compound material comprising organic material from the group consisting of nitrocellulose, styrene, polyvinyl acetate (PVAc), gelatine or the like and dyestuff or sub-oxide such as TeOx, GeOx, SbOx, MoOx or layered material comprising metallic material and organic material from the group consisting of AuPt—(polystyrene, polymethylmethacrylate, polyvinylacetate or the like), Al-teflon or the like or magnetic film material from the group consisting of MnCuBi, CdCo, TbCo, TbFe, BdTbFe, TbFeCo or the like having a thickness in the range of 100 Å to 5000 Å.

13. A method as claimed in claim 8, wherein said optical information pattern layer having low light reflectivity is formed by way of the steps of coating the inside surface of the protective layer with printing.

14. A method as claimed in claim 2, wherein said optical information pattern layer having low light reflectivity is formed by way of the steps of coating the optical reflective film with photographic emulsion and then carrying out exposing and developing.

15. A method as claimed in claim 2, wherein said optical information pattern layer having low light reflectivity is formed by way of the steps of coating the optical reflective film with forming a colored layer having low optical reflectivity and then carrying out etching or lift-off.

16. A method as claimed in claim 2, wherein said optical information pattern layer having low light reflectivity is formed by way of the steps of coating the optical reflective film with providing a layer on which optical information patterns are formed by etching or lift-off and then coloring said layer.

17. A method as claimed in claim 8, wherein said optical information pattern layer having low light reflectivity is formed by way of the steps of coating the inside surface of the protective layer with photographic emulsion and then carrying out exposing and developing.

18. A method as claimed in claim 8, wherein said optical information pattern layer having low light reflectivity is formed by way of the steps of coating the inside surface of the protective layer with forming a colored layer having low optical reflectivity and then carrying out etching or lift-off.

19. A method as claimed in claim 8, wherein said optical information pattern layer having low light reflectivity is formed by way of the steps of coating the inside surface of the protective layer with providing a layer on which optical information patterns are formed by etching or lift-off and then coloring said layer.

20. In an optical recording card including optical recording medium which is held between a card base and a light permeable protective layer, the improvement wherein said optical recording medium comprises a base film, an optical reflective film formed only on said base film and an optical information pattern layer having low optical reflectivity formed on said optical reflective film in direct surface contact, a locating of said reflective film between said base film and said pattern layer permitting use of a reading light beam incident upon said reflective film via said pattern layer; and wherein said optical reflective film is constructed by metallic material selected from the group consisting of Ni, Ti, Te, Bi, In, Pb, Sn, Sb, Zn, Se, Ga, Cd, Ag, Au, Cu, Cr, Al, or the like or their alloy material having a thickness in the range of 50 to 2000 Å or compound material comprising organic material and/or inorganic material selected from the group consisting of Te—C, Te—$CS_2$, Bi—$CS_2$, Te—telfon, Ag—gelatine or the like having a thickness in the range of 100 Å to 10 microns or multilayered film selected from the group consisting of Te—dyestuff, Te—nitrocellulose, metallic material film-dielectric material film having a thickness in the range of 100 Å to 10 microns or dyestuff film selected from the group consisting of cyanine dye, phthalocyanine dye, naphtoquinone dye having a thickness in the range of 100 Å to 10 microns or compound material comprising organic material selected from the group consisting of nitrocellulose, styrene, polyvinyl acetate (PVAc), gelatine and dyestuff or sub-oxide selected from the group consisting of $TeO_x$, $GeO_x$, $SbO_x$, $MoO_x$ or layered material comprising metallic material and organic material selected from the group consisting of AuPt-(polystyrene, polymethylmethacrylate, polyvinylacetate,), Al-teflon or magnetic film material selected from the group consisting of MnCuBi, CdCo, TbCo, TbFe, GdTbFe, TbFeCo. having a thickness in the range of 100 Å to 500 Å.

* * * * *